United States Patent [19]

Kitrell

[11] 4,046,397
[45] Sept. 6, 1977

[54] REFLECTOR DEVICE FOR BICYCLES

[76] Inventor: John V. Kitrell, 1830 N. 49th, Lincoln, Nebr. 68504

[21] Appl. No.: 691,822

[22] Filed: June 1, 1976

[51] Int. Cl.² .............................................. B62J 5/20
[52] U.S. Cl. .................................. 280/289 R; 116/41; 350/105
[58] Field of Search ....................... 116/41, 47, 53, 56; 350/97, 103, 105; 280/289 R

[56] References Cited

U.S. PATENT DOCUMENTS

| 1,279,676 | 9/1918 | Dwyer | 116/41 |
| 1,347,334 | 7/1920 | Johnson | 116/53 |
| 1,505,128 | 8/1924 | Bern | 116/41 |
| 1,656,385 | 1/1928 | Morse | 116/41 |
| 1,759,247 | 5/1930 | Trautman | 116/41 |
| 3,791,336 | 2/1974 | Zdebski | 116/41 X |
| 3,961,596 | 6/1976 | Schiavone | 116/53 |
| 3,967,575 | 7/1976 | Coutts | 280/289 X |

FOREIGN PATENT DOCUMENTS

| 805,837 | 12/1936 | France | 116/53 |
| 179,305 | 8/1935 | Switzerland | 280/289 R |

Primary Examiner—Philip Goodman
Assistant Examiner—Terrance L. Siemens
Attorney, Agent, or Firm—Zarley, McKee, Thomte & Voorhees

[57] ABSTRACT

A safety reflector device comprising an elongated channel-shaped support having a plurality of flat rectangular shaped reflector members pivotally mounted therein. The reflector members are pivotally movably receivable between the side walls of the support for purposes of storage or handling. The reflector members may be selectively pivotally moved outwardly with respect to the support to present a fan-shaped appearance. The inner ends of the reflector members are provided with indexing structure so that the reflector members are held in the proper spaced-apart open position. The device may be either hand held or attached to a bicycle or the like.

9 Claims, 8 Drawing Figures

U.S. Patent  Sept. 6, 1977  4,046,397
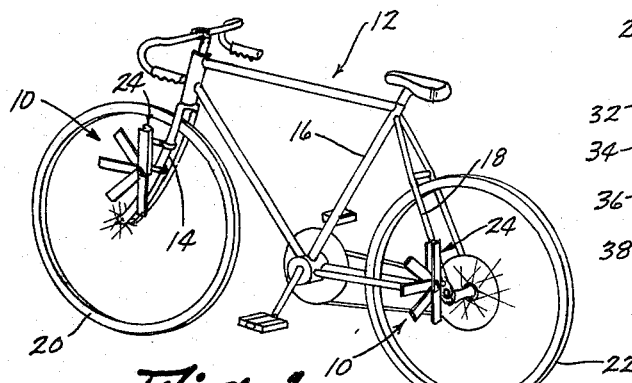
Fig. 1
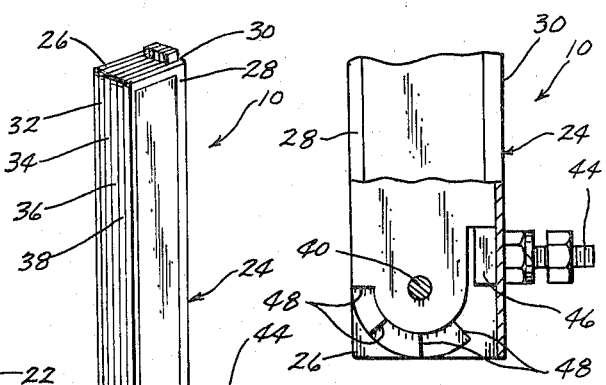
Fig. 2
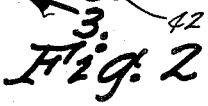
Fig. 3
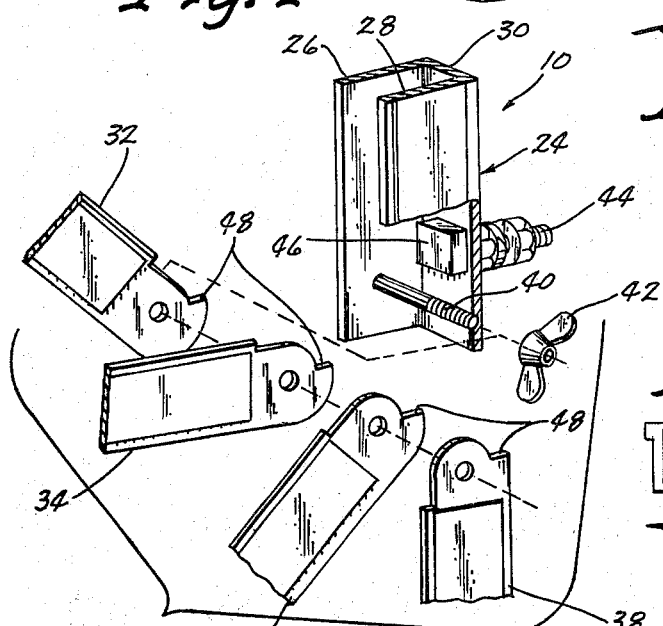
Fig. 4
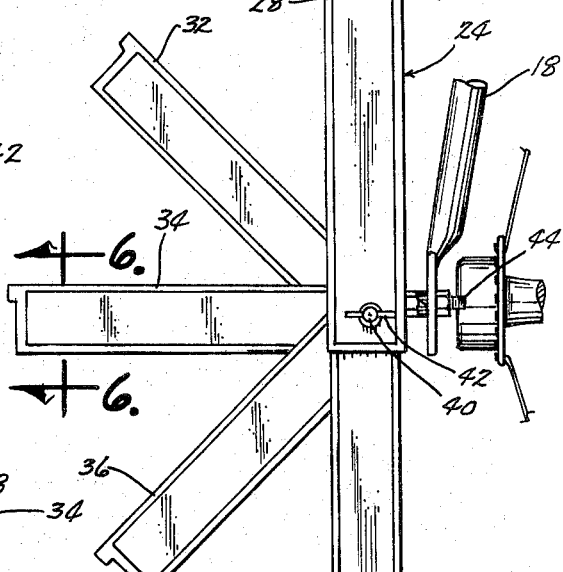
Fig. 5
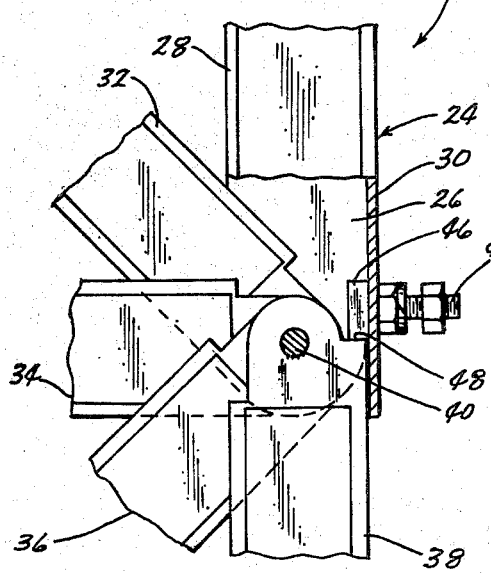
Fig. 7
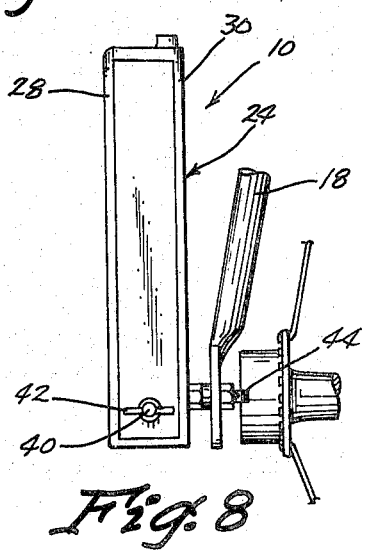
Fig. 8

REFLECTOR DEVICE FOR BICYCLES

BACKGROUND OF THE INVENTION

This invention relates to a safety reflector device and more particularly to a reflector device which provides a light gathering area which simulates mass when viewed from a distance while being influenced by an artificial light source but which makes a transition into an identifiable pattern as the distance between the reflector and the viewer closes. Additionally, the invention relates to a device which may be reducible in size for storage or handling when not in use.

Heretofore, various types and sizes of reflective materials have been assembled into devices to provide protection during darkness for objects to which they are attached when these objects are subjected to a light source from approaching vehicles. When such prior devices have been used previously, the mass described by the reflected light, when viewed from a distance, has been on a one-to-one ratio when the area of the reflective material presented by the devices. Thus, the prior devices presented a continuous source of compromise between desired adequate illumination and practicality of such a device from the standpoint of cost, size, appearance in daylight, and general consumer acceptability.

The above-described difficulties have been particularly relevant in the design and general use of such devices on cycles such as bicycles or the like which, by their very nature, should require a large display of illumination when operated during hours of darkness but due to the petite size of the structural members of the machine, good taste dictates a restriction on the size of any device attached thereto as when viewed in the daylight.

Therefore, it is a principal object of this invention to provide an improved safety reflector device.

A further object of the invention is to provide a safety reflector device which provides a large reflective mass when viewed by night but which is convertible to a small esthetically acceptable device when viewed in daylight.

A further object of the invention is to provide a device having a sufficiently small size so that it is easily stowable as emergency gear but which may be converted to a large display mass when an emergency arises.

A still further object of the invention is to provide a safety reflector device for use with bicycles wherein the support member for the reflective members may have the bicycle license number applied thereto.

A still further object of the invention is to provide a safety reflector device which may be carried on the person when not being used but which may be easily converted to a hand held reflective mass for use at night.

A further object of the invention is to provide a safety reflector device which is economical to manufacture, durable in use and refined in appearance.

BRIEF DESCRIPTION OF THE DRAWINGS

FIG. 1 is a perspective view of a bicycle having the device of this invention attached adjacent the front and rear wheels thereof with the devices being in the open operative position:

FIG. 2 is a perspective view of the device in a closed position:

FIG. 3 is an enlarged sectional view of the device as seen on lines 3—3 of FIG. 2:

FIG. 4 is a partial exploded perspective view:

FIG. 5 is an end view of the device in an open position:

FIG. 6 is a sectional view as seen on lines 6—6 of FIG. 5:

FIG. 7 is a partial sectional view illustrating the indexing structure at the inner ends of the pivotal reflector members; and FIG. 8 is a rear view of the bicycle having the device of this invention mounted thereon and being in a closed position.

SUMMARY OF THE INVENTION

A safety reflector device which may be either hand held or mounted on a bicycle or the like to present a large reflective mass when subjected to light from automobile headlights or the like. The device includes an elongated U-shaped channel member including spaced-apart side walls. A plurality of flat reflector members or segments are pivotally connected at their lower ends to the lower end of the channel-shaped support and may be pivotally moved from a stored position to an operative position. In the stored position, the reflector members are received between the side walls of the support. The reflector members may be pivotally moved with respect to the support and are automatically positioned in a fanshaped configuration so as to present a large reflective mass when viewed from a distance but which becomes an identifiable object as the light source approaches the device. The device may be either hand held or may be attached to the front and rear portions of the bicycle or the like.

DESCRIPTION OF THE PREFERRED EMBODIMENT

The numeral 10 generally refers to the reflector device of this invention while the numeral 12 refers to a bicycle including a front fork 14, frame 16 and rear fork 18. Front wheel 20 is conventionally mounted in front fork 14 while rear wheel 22 is conventionally mounted in rear fork 18.

Reflector device 10 generally comprises an elongated U-shaped or channel-shaped support 24 having side walls 26 and 28 connected by an end wall 30. The numerals 32, 34, 36 and 38 refer to flat rectangular-shaped reflector members or segments which are pivotally connected at one end thereof to the lower end of support 24 by means of bolt 40 as seen in the drawings. Wing nut 42 is threadably mounted on one end of bolt 40.

The numeral 44 refers to a mounting bolt which extends through a suitable opening formed in the lower end of end wall 30 so that the head portion 46 of bolt 44 is positioned as seen in the drawings. The inner ends of members 32, 34, 36 and 38 are provided with stops 48 formed therein. The stops 48 on each of the members 32, 34, 36 and 38 are different so that the stops 48 of the members 32, 34, 36 and 38 will engage head 46 so that further pivotal movement of the members 32, 34, 36 and 38 is prevented to cause the members to be automatically positioned in the fan-shaped configuration seen in the drawings. Mounting bolt 44 may be extended through an existing opening in the rear fork 18 and maintained thereon by a suitable nut as seen in FIGS. 5 and 8.

Each of the reflector members is provided with a conventional reflective surface of the front and back sides thereof. Likewise, side walls 26 and 28 are also provided with a reflective surface thereon.

Assuming that the reflector device 10 is mounted on the rear wheel as seen in FIG. 8, wing nut 42 would normally be tightened so that the reflector members 32, 34, 36 and 38 are maintained between the sidewalls 26 and 28 of the support 24. In the closed position, the entire device occupies very little space and is esthetically attractive. When the bicycle is going to be used at night, wing nut 42 is loosened and the reflector members 32, 34, 36 and 38 are pivotally moved with respect to the support 24 to achieve the fan-shaped configuration seen in the drawings. As previously stated, the stops 48 on the reflector members automatically position the reflector members in the fan-shaped configuration. However, while the stops 48 are desirable, the stops could be omitted with the reflector members being positioned in their proper position with the wing nut 42 being tightened to maintain the members in the fan-shaped configuration.

When the device 12 is in the fan-shaped configuration seen in the drawings, the device will present a large reflective mass when viewed from a distance but will become a highly distinguishable object as the light source approaches the device. While it has been described that four of the reflector segments or members are provided, it should be noted that any particular number may be used.

One of the devices may also be attached to the front fork of the bicycle by simply employing a pair of clamp members rather than a mounting bolt 40 so that the device presents a large reflective surface when viewed from the side of the bicycle.

It is preferred that both sides of the reflector members and the support member 24 have a highly visible and reflective exterior surface. If desired, the bicycle license number may be imprinted on either of the side walls 26 and 28 to provide a readily visible identification for the bicycle.

Although the device has been described as being particularly well suited for use on a bicycle, it should be noted that it could be carried in a purse or the like and hand held during emergency use. The device occupies very little space when in the closed position but does provide a highly reflective mass when the reflector members are pivotally moved outwardly to the fan-shaped configuration. Thus it can be seen that the reflector device of this invention accomplishes at least all of its stated objectives.

I claim:

1. A safety reflector device, comprising, a support means, and a plurality of flat, substantially rectangular members having opposite ends and opposite sides, said members being selectively pivotally secured, at one end thereof, to said support means, said members having a light reflective surface on at least one side thereof, said members being selectively pivotally movable from a superimposed stored position to a fan-shaped operative position, said members having substantially their entire lengths spaced from each other, when in said operative position, so that the device will present a large reflective mass when viewed from a distance and so that the device will become a distinguishable object as the light source approaches the device from said one side.

2. The device of claim 1 wherein said support means comprises a substantially vertically disposed channel means, said members being pivotally secured at one of their ends to the lower end of said channel means and being received within said channel means when in their stored position.

3. The device of claim 1 wherein indexing means is provided on the said one ends of said members for positioning said members in said operative position.

4. The device of claim 4 wherein said channel means has a pair of spaced-apart side walls, said side walls having a light reflective surface thereon.

5. The device of claim 5 wherein means is provided on said support for mounting said support on a bicycle.

6. The device of claim 6 wherein said means provided on said support comprises a bolt member extending from said support.

7. The device of claim 7 wherein said means provided on said support comprises a clamp means extending from said support.

8. In combination with a bicycle having front and rear fork members, a first safety reflector device operatively secured to at least said rear fork member, said device comprising a support means operatively secured to said rear fork member; a plurality of flat, substantially rectangular members selectively pivotally secured at one end thereof to said support and having a light reflective surface on at least one side thereof; said members being selectively pivotally movable from a stored position to an operative position with respect to said support means, said members being disposed substantially transversely to the direction of travel to said bicycle, said members having substantially their entire lengths spaced from each other, when in said operative position, so that the device will present a large reflective mass when viewed from a distance and so that the device will become a distinguishable object as the light source approaches the device from said one side.

9. The combination of claim 8 wherein a second safety reflector device is operatively secured to the front fork member whereby the rectangular members thereof are disposed substantially parallel to the direction of travel of said bicycle.

* * * * *